United States Patent Office 3,298,985
Patented Jan. 17, 1967

3,298,985
RESINS FORMED FROM FORMALDEHYDE, RESORCINOL AND 4,4-BIS-(4-HYDROXYPHENYL)-PENTANOIC ACID OR AMIDE THEREOF
Charles Tyler Bills, Metuchen, and Peter A. Yurcick, South River, N.J., assignors to Catalin Corporation, a corporation of Delaware
No Drawing. Filed Oct. 23, 1965, Ser. No. 504,119
16 Claims. (Cl. 260—29.3)

This application is a continuation-in-part of our copending application Serial No. 312,339, filed September 30, 1963, now abandoned.

This invention relates to an improved resorcinol-formaldehyde rubber latex adhesive system for automative tire cords, and more particularly to a novel, modified resorcinol-formaldehyde resinous composition for incorporation in such systems and to a method of making the same.

With the widespread use of synthetic fibers such as rayon, nylon and, more recently, polyesters in automotive tire cords, the rubber industry has devoted considerable effort to finding new adhesives which will satisfactorily bond such fibers to the tire body during vulcanization. Adhesive systems containing resorcinol-formaldehyde resins and rubber latex as essential active ingredients have met requirements for bonding these tire cords better than other adhesive materials, and such adhesive systems enjoy extensive commercial acceptance and use. Nevertheless, resorcinol-formaldehyde resin-rubber latex adhesives do have shortcomings as not all of the adhesive requirements in tire cord bonding are best satisfied by such adhesives.

It has now been discovered that modification of resorcinol-formaldehyde resin with 4,4-bis(4-hydroxyphenyl)-pentanoic acid or its amide gives a novel resinous composition which when combined with rubber latex results in tire cord adhesive systems which are superior to conventional adhesives of this type. In particular, tire cord adhesive systems utilizing the novel modified resorcinol-formaldehyde resinous composition of the present invention give better static and dynamic adhesion of synthetic tire cords, and better resistance to heat degradation of the adhesive bond formed in the tire body.

No evidence has yet been uncovered for any particular mechanism by which tire cord adhesive systems are so remarkably improved by use of the novel modified resorcinol-formaldehyde resinous composition of the invention. The art has postulated that hydrogen bonding derived from the resorcinol-formaldehyde resin in such adhesive systems or introduction of a better keying surface for rubber by means of the resorcinol-formaldehyde resin may be reasons why conventional resorcinol-formaldehyde rubber latex adhesives give good results in tire cord bonding. However, there is no one explanation which is generally accepted as being correct, and the achievement of outstandingly better results with the improved systems of the invention, likewise cannot be definitely explained. Nevertheless, static and dynamic adhesion tests as well as heat durability tests have demonstrated that tire cords can be bonded in superior manner with the improved adhesive systems of the invention, giving considerably improved results over the conventional resorcinol-formaldehyde rubber latex tire cord adhesive.

In forming the novel resinous composition of the invention for incorporation in tire cord adhesive systems, resorcinol and 4,4-bis(4-hydroxyphenyl)-pentanoic acid or its amide are condensed with formaldehyde to form a clear liquid resinous solution having virtually indefinite shelf-like stability. 4,4-bis(4-hydroxyphenyl)-pentanoic acid is commonly known in the art as diphenolic acid, and has recently become available in commercial quantities. When used in forming the modified resin of the present invention, it is believed that the carboxylic acid of the modifying agent does not enter into the condensation reaction, but chemical union with the resorcinol-formaldehyde system is achieved via the unsubstituted reactive positions present on the benzene ring. The fact that the carboxylic acid may remain intact in the novel modified resorcinol-formaldehyde resin may account for the unexpectedly superior adhesion results which are obtained when the modified resin is utilized to formulate adhesive compositions with rubber latex. The amide group which reacts with the formaldehyde used in the reaction system to form a methylol group or methylene linkage appears to have a still further effect as compared to the free carboxyl group since in actual tests the cord treated with the resin containing the amide group resulted in higher tensile strength.

In preparing the modified resinous composition of the invention, reaction may be carried out in one or two stages. In the one stage procedure, all of the reactants are mixed together at one time and then the reaction mixture is condensed for a suitable period of time to obtain a heat-condensed reaction product wherein all of the initial ingredients have combined chemically. In the two stage process, the 4,4-bis(4-hydroxyphenyl)-pentanoic acid or the amide thereof is first reacted with a portion of the total formaldehyde that is used in forming the modified resin, and thereafter this condensed material is further reacted with resorcinol and additional formaldehyde. The two stage reaction eliminates competition between the extremely reactive positions of resorcinol and the somewhat less reactive positions of the 4,4-bis(4-hydroxyphenyl)-pentanoic acid or amide for the total formaldehyde that is used, thus ensuring that all of the 4,4-bis(4-hydroxyphenyl)-pentanoic acid or amide will become chemically united with the other ingredients. For this reason, the two stage reaction is preferred.

The reaction may be carried out either in alkaline or acid medium. For alkaline condensation, alkali metal hydroxides, alkaline earth metal hydroxides and strong tertiary amines can be used as the catalyst. Generally the amount of catalyst can be anywhere from zero to about 0.5 mol per mol of resorcinol that is used in the reaction. As for condensation on the acid side, no additional acid catalyst is actually necessary when 4,4-bis(4-hydroxyphenyl)-pentanoic acid is used since this compound is strongly acidic and acts as both a catalyst and a reactant. However, where the amide is used, or if desired in the case of the acid too, additional acid catalysts may be added in an amount ranging from about 0.5% to about 2% based on the total weight of resorcinol and modifying agent employed in the reaction system. Specific acid catalysts which may be used include oxalic, hydrochloric and sulfuric acids.

Where the reaction is carried out on the acid side, the product will not have adequate stability unless the final pH is adjusted to within the range of about 6 to 10 or even higher, or unless the resorcinol or both the resorcinol and the 4,4-bis(4-hydroxyphenyl)-pentanoic acid or amide are first prereacted with propylene oxide in which event adjustment of the final pH is not necessary. Where required, the final pH of an acid condensed reaction product can be adjusted with any convenient alkali, such as the alkali metal hydroxides.

As regards proportions, the novel modified resorcinol-formaldehyde resinous compositions of the invention are prepared by reacting together resorcinol, from about 0.05 to about 1.5 mols of formaldehyde per mol of resorcinol and from about 0.01 to about 0.4 mols of 4,4-bis(4-hydroxyphenyl)-pentanoic acid or its amide per mol of resorcinol. Where the propylene oxide is employed for prereaction with either resorcinol alone or with both resorcinol and 4,4-bis(4-hydroxyphenyl)-pentanoic acid or amide it is used in amounts ranging from zero to about 0.5 mol per mol of resorcinol. The amount of alkali catalyst where alkaline condensation is used, will be from zero to about 2.0 mols per mol of resorcinol and preferably up to about 0.5 mol per mol of resorcinol.

As previously mentioned, the reaction may be carried out in the preferred manner of two stages. In such a two stage reaction, the whole of the amount of 4,4-bis(4-hydroxyphenyl)-pentanoic acid or amide and part of the total amount of formaldehyde to be used are first condensed together and this reaction may be carried out at temperatures from about 60° C. to about 150° C. At these temperatures, the reaction time will be from about 1 to 3 hours but with higher or lower reaction temperatures the reaction time will be correspondingly longer or shorter. The reaction is continued until the free formaldehyde in the mixture has dropped to 8% by weight or below. Thereafter, the resorcinol and the remaining portion of the formaldehyde are added and the reaction mixture is further condensed at temperatures from about 60° C. to 110° C. for from about ½ to 1½ hours. The reaction can be terminated when the free formaldehyde in the reaction mixture has dropped to 1% by weight or less. Where propylene oxide is prereacted with the resorcinol or the combination of resorcinol and 4,4-bis(4-hydroxyphenyl)-pentanoic acid or amide, the reaction temperature will slowly increase as the propylene oxide is consumed and the reaction will be completed when the reaction temperature has levelled off and no longer increases to an appreciable extent. Generally speaking, the propylene oxide will react at gradually increasing temperatures of about 60° C. to 150° C. and reaction will be completed in from about 2 to 5 hours.

In the one stage reaction procedure, all of the reactants are mixed together, and then condensed at a temperature within the range from about 50° C. to 110° C. The reaction will usually be completed at these temperatures in from about ¾ hour to 2 hours, and when reaction has been completed, the free formaldehyde in the mixture will be 1% by weight or less. As previously pointed out, where the condensation reaction has been carried out on the alkaline side, the final product obtained will have excellent stability and no adjustment of its pH will be necessary. Where the reaction has been condensed on the acid side without first prereacting the resorcinol or the resorcinol and 4,4-bis(4-hydroxyphenyl)-pentanoic acid or amide with propylene oxide, it will be necessary to adjust the final pH with alkali to within the range from about 6 to 10 or even higher to achieve equivalent stability.

The reaction may be conveniently carried out in aqueous medium and, if desired, additional organic solvents may also be employed. For example, low molecular weight alcohols, ketones and esters such as methanol, acetone and ethyl acetate may be added to the reaction mixture to help dissolve the various components where such is desired or necessary.

The ranges of temperatures set forth hereinabove for the various reactions to be carried out are not critical, but instead represent workable temperature ranges in which the reaction products can be produced at a reasonably rapid rate for commercial operations. While the reactions will take place at higher or lower temperatures, problems of temperature control, excessive vaporization of reactants and uneconomical manufacturing output may be encountered which make the higher or lower temperatures less desirable.

The reaction products are clear resinous solutions usually having a reddish color and contain about 75% by weight of solids. These reaction products can be mixed with the usual forms of rubber latex in aqueous dispersion that are used in conventional resorcinol-formaldehyde latex tire cord adhesives. Among the various forms of rubber latex that may be employed are included styrene-butadiene latex, styrene-butadiene-vinyl pyridine terpolymer latex, butadiene latex and others which are known to the art. The range of proportions in 100 parts by weight of the mixture of rubber latex and the novel modified resorcinol-formaldehyde resin of the invention may be from 5 to 95 parts of the rubber latex and correspondingly from 95 to 5 parts of the modified resin. Other conventional ingredients such as alkali and formaldehyde may be included in the final adhesive system in known manner.

The following examples will illustrate further details of the invention and represent preferred embodiments thereof.

*Example 1*

A modified resorcinol-formaldehyde resin was prepared by mixing 205 grams (0.72 mol) of 4,4-bis(4-hydroxyphenyl)-pentanoic acid, 232 grams (2.88 mols) of a 37% aqueous solution of formaldehyde and 120.5 grams (0.75 mol) of a 25% aqueous solution of sodium hydroxide in a jacketed kettle. Initially the mixture was exothermic, and heat was applied as necessary to condense the reactants at 70° C. The reaction pH was 9.1 and reaction was continued for about 1½ hours after which the free formaldehyde in the mixture fell to below 8% by weight. The reaction mixture was then cooled to 50° C. and to it was added 1500 grams (13.6 mols) of resorcinol and 350 grams (4.31 mols) of the 37% aqueous solution of formaldehyde. The mixture was heated to 105° C. and refluxed at that temperature for an additional ½ hr. At this time, the free formaldehyde concentration in the reaction mixture was less than 1% by weight and the mixture was cooled. The final product was a clear red resin solution, containing about 75% solids and the solution had excellent stability for more than one year.

*Example 2*

A mixture containing 410 grams (1.43 mols) of 4,4-bis-(4-hydroxyphenyl)-pentanoic acid, 391 grams (5.74 mols) of a 44% aqueous solution of formaldehyde and 60.3 grams (1.5 mols) sodium hydroxide (added as 25% aqueous solution) was heated to 70° C. for 1 hour. The free formaldehyde concentration in the reaction mixture at the end of this time was less than 8% by weight. The product was cooled to 50° C. and 3000 grams (27.3 mols) of resorcinol, 589 grams (8.63 mols) of the 44% aqueous solution of formaldehyde, 39 grams of methanol and 73 grams of water were added. The mixture was then heated to reflux at 107° C. and was refluxed for one-half hour. At the end of this time, the free formaldehyde concentration was less than 1% by weight. The final product was a clear red resin solution containing 75% of solids and having a viscosity of 28 poises at 25° C.

*Example 3*

A mixture consisting of 750 grams (2.62 mols) of 4,4-bis(4-hydroxyphenyl)-pentanoic acid, 557 grams (8.17 mols) of 44% aqueous solution of formaldehyde and 113 grams (2.82 mols) of sodium hydroxide (added as a 50% aqueous solution) was heated to 70° C. and condensed at 70° C. for 1 hour. At the end of this time the free formaldehyde concentration in the product was about 6.5% by weight. The product was cooled to 50° C. and 750 grams (6.82 mols) of resorcinol was added. The mixture was heated to reflux at 105° C. and was refluxed for one half hour following which the free formaldehyde concentration in the product was not over 1% by weight. The resultant product was a clear red viscous solution similar to the one obtained in Example 2.

*Example 4*

A mixture consisting of 1500 grams (13.6 mols) of resorcinol, 205 grams (0.72 mol) of 4,4-bis(4-hydroxyphenyl)-pentanoic acid and 750 grams of water was heated to 80° C. Holding the solution at 85–90° C., 557 grams (6.87 mols) of 37% aqueous solution of formaldehyde was slowly added over a 1 hour period. The mixture was then heated to reflux at 101° C. and refluxed for one hour. The product obtained by this procedure had a pH of 3.20 and contained about 55% solids by weight. The product showed a tendency to form a precipitate after a few weeks of standing on the shelf.

To another batch of this product, sufficient sodium hydroxide was added to raise its pH to slightly above 6. This batch remained clear and stable for about one year, without giving any indication of a lack of stability.

*Example 5*

A mixture consisting of 1500 grams (13.6 mols) of resorcinol, 205 grams (0.72 mol) of 4,4-bis(4-hydroxyphenyl)-pentanoic acid, 204 grams of water and 396 grams (6.71 mols) of propylene oxide was heated to atmospheric reflux at 105° C. Refluxing was continued for about 2½ hours during which the reflux temperature gradually rose to 120° C. Thereafter the reaction temperature remained substantially constant without any further appreciable increase. The reaction product was cooled to 65° C. and 553 grams (6.81 mols) of a 37% aqueous solution of formaldehyde was slowly added over a one hour period. The product was then heated to atmospheric reflux at 105° C. and refluxed for another hour. At the end of this time the free formaldehyde concentration in the product was not over 1% by weight. The final product was clear with a pH of 4.5, a room temperature viscosity of 16 poises and solids content of 69% by weight. The product retained its clarity and was completely stable for more than one year.

*Example 6*

A mixture consisting of 1500 grams (13.6 mols) resorcinol, 204 grams of water and 396 grams (6.71 mols) of propylene oxide was heated to atmospheric reflux at 101° C. and refluxing was continued over a period of about 2½ hours. During this time the reflux temperature gradually rose to 120° C. and then levelled off and remained substantially constant. The product was then cooled to 50° C. and 205 grams (0.72 mol) of 4,4-bis(4-hydroxyphenyl)-pentanoic acid was added. The mixture was heated to 64° C. and 553 grams of a 37% aqueous formaldehyde solution (6.81 mols) was slowly added. The mixture was then heated to atmospheric reflux at 105° C. and reflux was maintained for one hour. At the end of that time the free formaldehyde concentration in the product was not over 1% by weight. The resulting product was clear with a pH of 4.15, a room temperature viscosity of 10 poises and a solids content of 69% by weight. The product remained clear and had excellent stability for more than one year.

*Example 7*

A mixture consisting of 205 grams (0.72 mol) of 4,4-bis(4 - hydroxyphenyl)-pentanoic acid, 1500 grams (13.6 mols) of resorcinol, 490 grams of a 37% aqueous formaldehyde solution (6.04 mols), 1000 grams of water, 19.3 grams of methanol, and 60 grams (1.5 mols) of sodium hydroxide (added as a 25% aqueous solution) was heated to atmospheric reflux at 99° C. and refluxed for one hour. At the end of that time the free formaldehyde concentration in the product was not over 1% by weight.

The product was vacuum dehydrated to yield a final product which was clear, stable and had a viscosity of 30 poises at room temperature, and contained 75% by weight of solids.

*Example 8*

A standard resorcinol-formaldehyde rubber latex tire cord adhesive consisting of a resorcinol-formaldehyde resin and styrene-butadiene rubber latex was tested for static and dynamic adhesion and heat durability in bonding nylon and polyester tire cords during vulcanization. The same tests were repeated for a tire cord adhesive formulated by substituting the reaction product of Example 2 in place of the resorcinol-formaldehyde resin in the conventional adhesive. The adhesive containing the Example 2 reaction product gave superior bonding in these tests, particularly in the case of the polyester cords where the static and dynamic adhesion and the heat durability were each greater than obtained with the conventional adhesive.

*Example 9*

Examples 1 to 8 were repeated except that the amide of 4,4-bis(4 - hydroxyphenyl)-pentanoic acid was substituted for the acid. The results of the adhesive performance tests were slightly better than in the case of 4,4-bis(4-hydroxyphenyl)-pentanoic acid and, in addition, the amide modified resin appeared to give a higher tensile strength to the tire cord fibers.

It will be noted that the reaction product of Example 4, which was condensed in acid medium without first prereacting the resorcinol or the 4,4-bis(4-hydroxyphenyl)-pentanoic acid with propylene oxide, was unstable until the final pH of the product was adjusted with alkali to approximately 6.

It will be further noted that the pH of the final product obtained in Example 5 was less than 6, but the product was clear and completely stable because of prereaction of propylene oxide with the resorcinol and the 4,4-bis(4-hydroxyphenyl)-pentanoic acid, without any adjustment of the final pH.

Each of the reaction products obtained in Examples 1, 3 through 7 and 9 gave superior adhesion when used with rubber latex to bond cords during vulcanization.

While the invention has now been described specifically in terms of bonding automative tire cords, and the most outstanding results have been achieved in connection with such use, it will be obvious to those skilled in the art that the products of the invention have many other applications as well. For example, the novel modified resorcinol-formaldehyde resin of the invention and adhesive compositions in which it is incorporated may be used in the manufacture of seals, diaphragms, piping, hose, belting and in any other applications where a permanent bond between rubber and reinforcing cords or fabrics or between non-rubber surfaces is desired.

It will be further understood that it is intended to cover all changes and modifications of the preferred embodiments of the invention, herein chosen for the purpose of illustration, which do not constitute departures from the spirit and scope of the invention.

What is claimed is:

1. An adhesive composition particularly adapted for bonding automative tire cords which comprises a rubber latex and in mixture therewith a reaction product of resorcinol, from about 0.01 to about 0.4 mol of 4,4-bis(4-hydroxyphenyl)-pentanoic acid or the amide thereof per mol of resorcinol and from about 0.05 to about 1.5 mols of formaldehyde per mol of resorcinol, the relative weight proportions of said rubber latex and said reaction product per 100 parts of the mixture thereof being from 5 to 95 parts of said rubber latex and from 95 to 5 parts of said reaction product.

2. An adhesive composition as in claim 1 in which said reaction product includes as an integral, reacted component from zero to about 0.5 mol of propylene oxide per mol of resorcinol.

3. An adhesive composition as in claim 2 in which the pH of said reaction product is less than 6.

4. An adhesive composition as in claim 1 in which the pH of said reaction product is from about 6 to about 10.

5. An adhesive composition as in claim 1 in which said rubber latex is styrene-butadiene latex.

6. An adhesive composition as in claim 1 in which said rubber latex is styrene-butadiene vinyl pyridine terpolymer latex.

7. A resinous composition particularly adapted for incorporation in tire cord adhesives which comprises a reaction product of resorcinol, from about 0.01 to about 0.4 mol of 4,4-bis(4-hydroxyphenyl)-pentanoic acid or the amide thereof per mol of resorcinol and from about 0.05 to about 1.5 mols of formaldehyde per mol of resorcinol.

8. A resinous composition as in claim 7 in which said reaction product includes as an integral, reacted component thereof from zero to about 0.5 mol of propylene oxide per mol of resorcinol.

9. A resinous composition as in claim 8 having a pH less than 6.

10. A resinous composition as in claim 7 having a pH of from about 6 to about 10.

11. The method of forming a resinous composition for incorporation in tire cord adhesives which comprises reacting resorcinol, from about 0.01 to about 0.4 mol of 4,4-bis(4-hydroxyphenyl)-pentanoic acid or the amide thereof per mol of resorcinol and from about 0.05 to about 1.5 mols of formaldehyde per mol of resorcinol, said reaction being conducted at a temperature within the range from about 50° C. to 110° C., until the free formaldehyde concentration in the reaction mixture is not more than about 1% by weight.

12. The method as in claim 11 in which said reaction is carried out in the presence of from zero to about 2.0 mols of alkaline catalyst per mol of resorcinol, said catalyst being selected from the group consisting of alkali metal hydroxides, alkaline earth metal hydroxides and tertiary amines.

13. The method as in claim 11 which includes the step of adjusting the pH of the final reaction product to within the range from about 6 to about 10 by addition of alkali.

14. The method as in claim 11 which includes the steps of first reacting all of the 4,4-bis(4-hydroxyphenyl)-pentanoic acid or the amide thereof with a portion of all of the formaldehyde to be employed for the entire reaction, said first reaction being continued until the free formaldehyde concentration has been reduced at least to about 8% by weight, and thereafter completing the reaction with the remaining portion of formaldehyde and with the resorcinol.

15. The method as in claim 11 which includes the step of causing from zero to about 0.5 mol of propylene oxide per mol of resorcinol to take part in said reaction.

16. The method as in claim 11 in which said reaction is carried out in the presence of from zero to about 0.5 mol of alkaline catalyst per mol of resorcinol, said catalyst being selected from the group consisting of alkali metal hydroxides, alkaline earth metal hydroxides and tertiary amines.

References Cited by the Examiner

UNITED STATES PATENTS

| | | | |
|---|---|---|---|
| 2,385,374 | 9/1945 | Rhodes | 260—54 |
| 2,652,353 | 9/1953 | Wilson | 260—29.3 |
| 2,844,553 | 7/1958 | Taylor et al. | 260—58 |
| 2,907,729 | 10/1959 | Greenlee | 260—54 |

MURRAY TILLMAN, *Primary Examiner.*

SAMUEL H. BLECH, GEORGE F. LESMES,
*Examiners.*

J. B. LEUTGE, *Assistant Examiner.*